United States Patent Office 3,383,291
Patented May 14, 1968

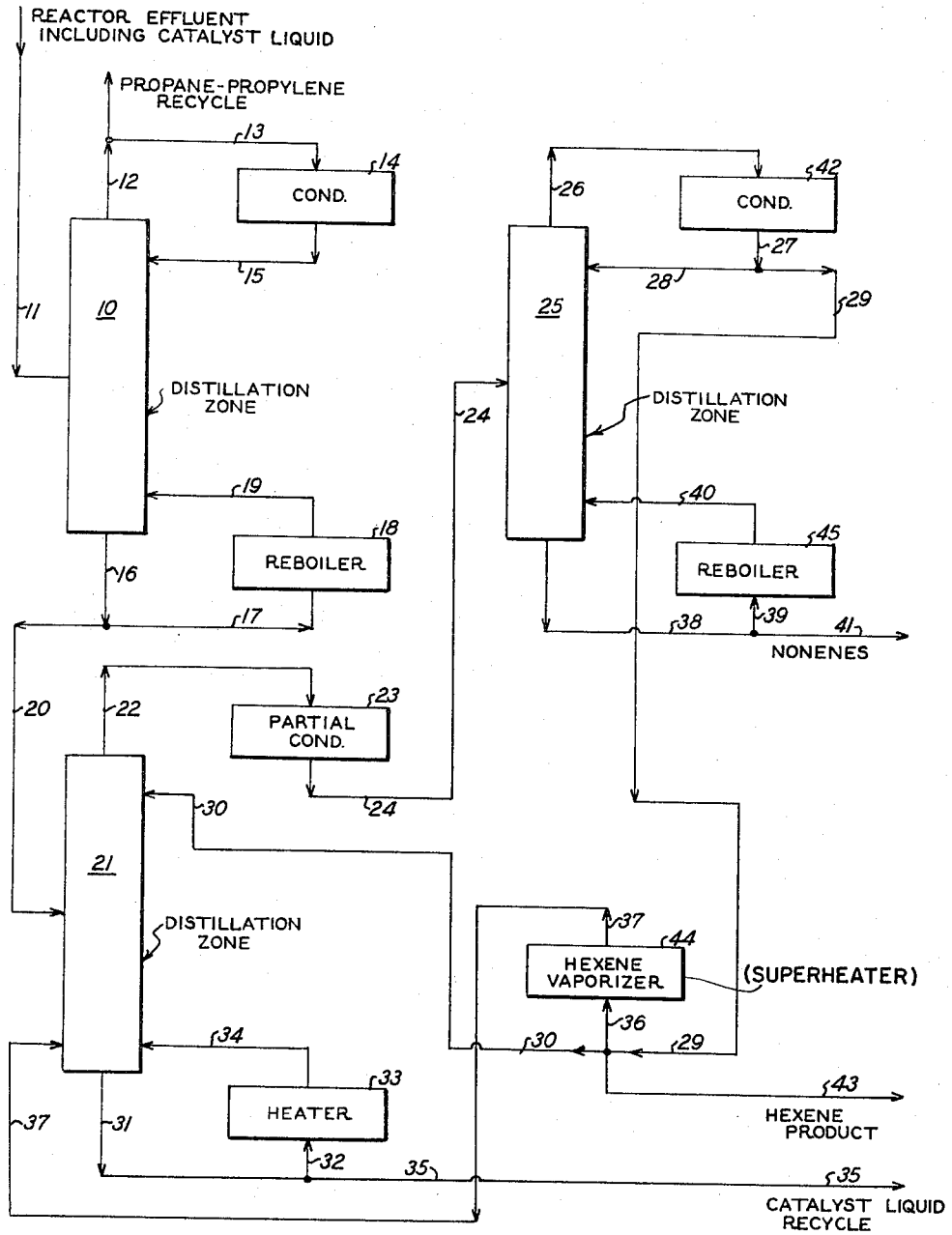

3,383,291
RECOVERY OF TRIALKYL ALUMINUM CATALYSTS BY PLURAL DISTILLATION WITH HYDROCARBON VAPOR STRIPPING
David Brown, Greenwich, Conn., John White Colton, Pelham Manor, Westchester, N.Y., and Robert Muller, Menlo Park, Calif., assignors to Halcon International, Inc., a corporation of Delaware
Continuation-in-part of application Ser. No. 107,538, May 3, 1961. This application June 9, 1965, Ser. No. 462,611
3 Claims. (Cl. 203—49)

ABSTRACT OF THE DISCLOSURE

This invention relates to a process for the recovery of trialkyl aluminum catalysts from a propylene dimerization reaction effluent and more particularly this invention relates to such a process wherein the catalyst is recovered substantially free of propylene trimer. This is accomplished by stripping propylene trimer with vaporized dimer under specific conditions.

This application is a continuation-in-part of application Ser. No. 107,538, filed May 3, 1961, now abandoned.

The liquid phase dimerization of propylene with aluminum trialkyl catalyst is a commercially valuable process for the preparation of branched chain hexenes. Branched chain hexenes may be cracked to make isoprene. It is important to process economics to recycle the aluminum trialkyl catalyst after separation of dimer from the reaction mixture.

Propylene trimer, nonene, is also formed in the reaction and if present in the recycled catalyst in substantial amounts, the life of the catalyst is shortened and the yield of dimer is markedly reduced.

The active form of the catalyst is aluminum tripropyl. When nonenes are allowed to build up in the catalyst the aluminum tripropyl undergoes trans-alkylation to aluminum tri-nonyl and is thusly rendered less active.

The nonenes can be removed from the catalyst by ordinary vacuum distillation techniques but it is undesirable to subject the catalyst to vacuum because in-leaked air causes rapid deactivation. The catalyst, however, decomposes at the elevated temperatures required for the application of normal distillation processes. The art is therefore confronted by the problem of providing an atmospheric or superatmospheric process whereby the catalyst can be recycled relatively free of the nonenes.

Catalyst as used herein refers to the aluminum trialkyl compounds. During a continuous operation however heavy propylene polymers such as dodecylenes and higher polymers may build up very slowly. These compounds cannot be removed from the aluminum trialkyl compounds except by very costly techniques. They are removed from the system therefore by continuously purging a very small stream of catalyst containing the heavy polymers. To minimize the loss of the expensive catalyst in this purge stream the heavy polymers are allowed to build up to significant proportions with respect to the catalyst. Just how much is allowed to build up depends upon economic considerations.

The material which is recycled to the dimerization reactor by the process of this invention may therefore be a relatively pure aluminum trialkyl mixture as for example when the process is starting up, or it may be a mixture of aluminum trialkyl compounds, dodecylenes and higher propylene polymers as for example in a process which has run for some time. This stream is commonly called the catalyst liquid and as stated it may contain varying proportions of dodecylenes and higher propylene polymers.

The dimerization reactor effluent contains this catalyst liquid substantially as fed to the reactor except for the tiny amount of dodecylene formed. The effluent contains as well however, along with unreacted propylene and product hexene, a substantial amount of nonenes. It is these nonenes which if not removed from the catalyst liquid prior to its recycle cause the deactivation of the aluminum trialkyl compounds.

It has been discovered that the nonenes can be removed from the aluminum trialkyl catalyst liquid in an atmospheric or superatmospheric process by stripping the catalyst with a hexene fraction. The hexene stripping medium at once reduces the temperature of the catalyst in the process, strips the catalyst of nonenes and retards formation of the inactive aluminum tri-nonyl. Surprisingly, there is no additional formation of nonene or dodecylene in the stripping zone due to the contact of hexenes and propylene with the catalyst. There is, therefore, no yield disadvantage incurred by stripping the catalyst with the hexene fraction.

The new process, in brief compass, contains the following process steps. Dimerization reactor effluent containing propylene, hexenes, nonenes and catalyst liquid is fractionated in a first distillation zone to remove propylene (and some propane) as an overhead fraction and the other components as a bottoms fraction.

The bottoms fraction from the first distillation zone is fractionated in a second distillation zone which is operated at atmospheric or superatmospheric pressure to remove, as an overhead product, all of the hexenes and almost all of the nonenes, and as a bottoms fraction, substantially nonene-free catalyst liquid. This is accomplished by recycling to the lower section of the second distillation zone a portion of nonene-free hexene vapor. It acts as a stripping agent for the nonenes, reduces the bottoms temperature in the second distillation zone and retards formation of inactive aluminum tri-nonyl.

To accomplish this, the overhead fraction from the second zone which contains hexenes and nonenes is fed to a third distillation zone wherein hexene is removed as an overhead product and nonenes are removed as a bottoms product. The bottoms are discarded from the process. The overhead is used in part, as reflux to the second distillation zone, and in part as the stripping vapor in the second distillation zone and the net make is pumped to product storage. The stripping hexene stream is vaporized and may be superheated prior to its introduction to the lower part of the second distillation zone.

In the accompanying drawing a dimerization reactor effluent is passed via line 11 into distillation tower 10. An overhead fraction of propylene (which may include propane) is withdrawn overhead via line 12 and may be recycled to the dimerization reactor. A part of the overhead fraction is passed via line 13 to condenser 14 wherein it is liquified and then passed via line 15 as reflux to the first distillation zone. A bottoms fraction is withdrawn via line 16 and part thereof is passed via line 20 to second distillation zone 21. A second part of the bottoms fraction is passed via line 17 to reboiler 18 wherein it is vaporized and then passed via line 19 to the lower section of the first distillation zone.

The overhead fraction from the second distillation zone 21 which contains hexenes and nonenes is passed via line 22 to condenser 23 wherein it is partially liquified. The mixture of vapor and condensate is passed via line 24 to the third distillation zone 25. The bottoms fraction from the second distillation zone which contains substantially nonene-free catalyst liquid is removed via line 31. A portion thereof is optionally passed via line 32 to reboiler 33 wherein it is vaporized and then passed via line 34 to the lower part of the second distillation zone. This step may be omitted if sufficient superheated dimer vapor is recycled to the second distillation zone. Catalyst deactivation is reduced by omitting the reboiler since there is no hot surface to contact the catalyst. The bottoms fraction is recycled via line 35 to the dimerization reactor.

In the third distillation zone an overhead fraction consisting of hexenes is removed via line 26. This stream is condensed in condenser 42 and a part of the condensate is passed via lines 27 and 28 to the third distillation zone as reflux. The remaining portion of the condensed hexenes is divided into three streams: (1) a portion is passed via line 30 to second distillation zone 21 as reflux; (2) a portion (the net process make) is passed via line 43 to hexene product storage; and (3) the remainder is passed via line 36 to hexene vaporizer 44. The latter portion after vaporization (and superheating if desired) is passed via line 37 to the lower portion of the second distillation zone.

The bottoms fraction from the third distillation zone is removed via line 38. The net process make of nonenes is discarded via line 41. A portion of the bottoms fraction is passed via line 39 to reboiler 45 wherein it is vaporized and then passed via line 40 to the third distillation zone.

When operating as described a hexene product sufficiently pure for cracking into isoprene is produced. In addition, the catalyst which is recycled to the dimerization reactor is sufficiently free of nonenes to insure desirable process yields and long catalyst life.

In general, the trialkyl aluminum utilized in the selective dimerization step can be any trialkyl aluminum. However, desirably the trialkyl aluminum is a tri-(lower-alkyl)aluminum such as aluminum trisobutyl or aluminum tripropyl. Apparently, in contact with propylene, aluminum trialkyls are converted to a mixture of aluminum tripropyl and aluminum 2-methylpentyl. As an illustration of the preparation of a catalyst, 180 parts of aluminum trisobutyl are charged to a high pressure autoclave equipped with heating means, cooling means and stirring means. Liquid propylene, 1,000 parts, is then added. Stirring is commenced and the temperature is raised to approximately 250° C. The pressure is that naturally attained and under the conditions described rises to approximately 1,800 p.s.i.g.; in one hour, the pressure drops to approximately 700 p.s.i.g. The reactor contains a mixture of the desired aluminum trialkyl in which the alkyl groups are propyl and 2-methyl-pentyl, and hydrocarbons which contain some isobutylene as well as some unreacted propylene. The aluminum alkyl catalyst is recovered, and is used to polymerize propylene at about 200° C. and 3,000 p.s.i.g.

The first distillation zone may be operated at a pressure from 25 to 250 p.s.i.a. and the overhead temperature will be from 25 to 125° F. The reflux ratio in the first distillation zone may be from 0.4 to 15 but it is preferred to use a reflux ratio of from 0.6 to 3.0. The bottoms fraction is from 250 to 450° F. depending upon the column pressure.

The second distillation zone may be operated at a pressure of from 15 to 200 p.s.i.a. The overhead temperature is from 145 to 400° F. and the bottoms temperature is from 250 to 500° F. It is preferable to operate under such conditions as will insure that the bottoms temperature does not exceed 458° F. To avoid catalyst degradation, consequently it is desirable to operate the second distillation zone at a pressure not exceeding 100 p.s.i.a. and preferable to operate below 80 p.s.i.a. The reflux ratio in the second distillation zone may be from 0.5 to 10 but it is preferred to operate in the range of from 0.7 to 2.0.

The third distillation zone may be operated at a pressure of from 2 p.s.i.a. to 450 p.s.i.a. The overhead temperature will be from 0 to 450° F. and the bottoms temperature will be from 150 to 550° F. The reflux ratio in the third distillation zone may be from 0.05 to 3.0 but it is preferred to operate in the range of from 0.1 to 1.0.

The quantity of hexene vapor recycle to the second distillation zone is independent of the amount of dodecylenes or high polymers in the catalyst liquid; it is based rather, on the amount of aluminum alkyl compound in the catalyst liquid (on a molar basis). It is desirable to use from 0.1 to 20 moles of stripping vapor per mole of aluminum trialkyl compound, preferable to use from 0.5 to 8.0 and most preferred to use from 1 to 3 moles of stripping vapor per mole of compound.

Transalkylation of a small portion of the aluminum tri-propyl to aluminum trihexyl occurs in the second distillation zone. However, no serious catalyst deactivation results due to this process.

The hexene stripping vapor may be superheated so as to decrease the heat load on the second distillation zone reboiler. The stripping vapor should be introduced to the second distillation zone in the lower part thereof and preferably as close to the bottom thereof as possible.

In view of the foregoing disclosures, variations and modifications of the process will be apparent to those who are skilled in the art. It is intended to include within the invention all of these variations and modifications except as do not come within the scope of the claims appended.

We claim:

1. A method for treating the effluent from a liquid phase propylene dimerization reaction which effluent contains unconverted propylene, hexenes, nonenes, and catalyst liquid said catalyst liquid containing aluminum trialkyl compound wherein: (1) the effluent is fractionated in a first distillation zone to remove as an overhead fraction, propylene, and as a bottoms fraction hexenes, nonenes and catalyst liquid; (2) the bottoms fraction from the first distillation zone is fractionated in a second distillation zone at a pressure of 15 to 200 p.s.i.a. to remove as an overhead fraction the hexenes and substantially all of the nonenes and as a bottoms fraction substantially nonene-free catalyst liquid; (3) the overhead from the second distillation zone is fractionated in a third distillation zone to remove, as an overhead fraction, hexenes and, as a bottoms fraction, nonenes; and (4) a portion of the overhead from the third distillation zone is vaporized, superheated and recycled to the lower section of the second distillation zone where it acts as a stripping vapor for the catalyst liquid, said stripping vapor being from 0.1 to 20 times the molar amount of aluminum trialkyl catalyst in said catalyst liquid.

2. A process as recited in claim 1 wherein the molar amount of overhead from the third distillation zone which is recycled to the second distillation zone as stripping vapor is from 1 to 3 times the molar flow of aluminum trialkyl compound in said catalyst liquid.

3. A process as recited in claim 1 wherein the second distillation zone is operated at a pressure of from 15 to 80 p.s.i.a.

References Cited

UNITED STATES PATENTS

| | | | |
|---|---|---|---|
| 2,371,860 | 3/1945 | Walls et al. | 203—49 |
| 2,452,797 | 11/1948 | Smith | 203—70 |
| 2,906,794 | 9/1959 | Aldridge et al. | 260—83.15 |
| 3,171,865 | 3/1965 | Davison et al. | 203—70 |
| 3,218,343 | 11/1965 | Acciarri et al. | 203—70 |
| 3,309,288 | 3/1967 | Butterbaugh | 203—70 |

FOREIGN PATENTS

| | | |
|---|---|---|
| 727,078 | 3/1953 | Great Britain. |

WILBUR L. BASCOMB, Jr., *Primary Examiner.*